2,919,563

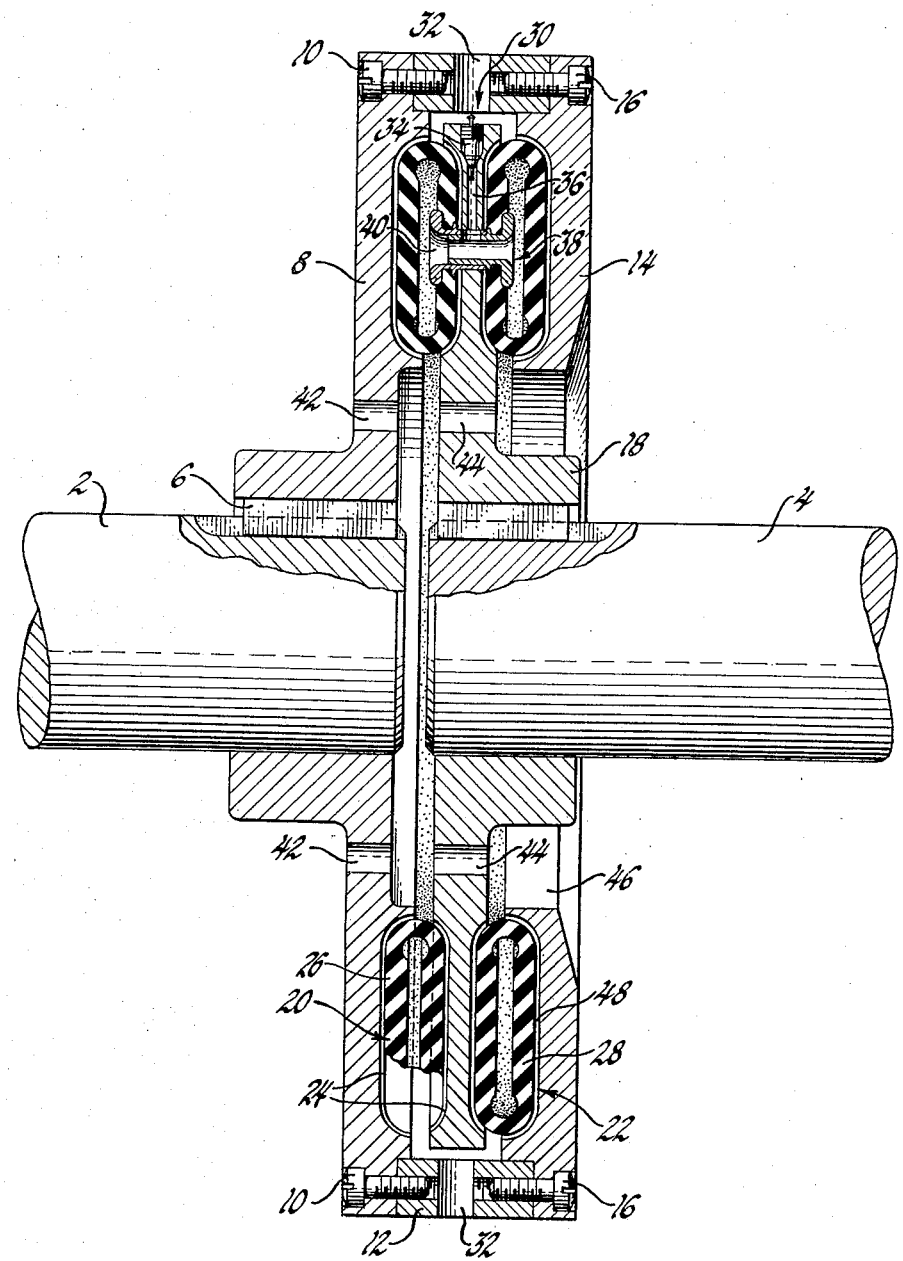

TORQUE TRANSMITTING COUPLING

Arthur F. Grant, Cleveland, Ohio, assignor to General Motors Corporation, Detroit, Mich., a corporation of Delaware Application December 9, 1957, Serial No. 701,393

1 Claim. (Cl. 64—30)

This invention relates to improvements in couplings for transmitting torque from a driving shaft to a driven shaft and more particularly to improved means in such couplings for compensating for angular and axial misalignment as well as for damping torsional and other types of vibration.

For a more complete understanding of the invention and the objects thereof, reference may be had to the accompanying detailed description taken in conjunction with the drawing in which the single figure illustrates the novel coupling shown in elevation with parts broken away and in section and applied between a driving and driven shaft.

Referring now to the drawing, a driving shaft is identified by the numeral 2 and is shown in substantially axial alignment with a driven shaft 4. Although shafts 2 and 4 are indicated to be driving and driven shafts, respectively, it will be appreciated that the shaft 4 could be the driving shaft and the shaft 2 could be the driven shaft. Keyed to the driving shaft 2 by key 6 is a radially extending disc or plate 8. Secured to the plate 8 at its outer periphery by means of the studs 10 is a cylindrical ring 12. The ring 12 extends axially and has secured thereto by studs 16 a second disc or plate-like member 14. Interposed between the plate members 8 and 14 and concentrically within the ring 12 is a third plate-like member or disc 18. Intermediate the axes of the shafts and plates and the outer periphery thereof are a pair of axially spaced toroidally shaped recesses 20 and 22 which are formed between the plates 8 and 18 and the plates 18 and 14, respectively. That part of the recess 20 formed in plates 8 and 18 is provided with radially extending ribs 24 on plates 8 and 18, respectively. Residing in the recesses 20 and 22 are a pair of similar axially spaced toroid-like tubes or tires 26 and 28, respectively. These tubes which may be made of rubber or some other flexible material are mutually inflatable as indicated generally at 30. It will be noted that the ring 12 is provided with a plurality of radially extending openings or holes 32, any one of which may be aligned with the valve 34 provided in the outer periphery of the plate 18. The valve 34 which may be in the nature of an ordinary tire valve is in communication with a radially extending passage 36 in plate 18 which leads to a hollow rivet-like assembly 38. The assembly 38 comprises a pair of flanged telescoping bushings 40 in open communication with the tubes 26 and 28. The plates 8 and 18 are provided with a plurality of radially positioned axially extending passages or ports 42 and 44, respectively, which allow air to enter between the plates 8 and 18 and 18 and 14. It will be noted that the plate 14 is formed with a hole 46 which is in axial alignment with the ports or axially extending passages 44. This arrangement of the ports 42, 44, the ribs 24 and similar ribs 48 on plates 14 and 18 allows air to enter hole 46 and ports 42 and 44 and be centrifuged radially through the passages past the tubes 26 and 28 and out the ports 32 so as to provide cooling for the tubes and the coupling.

The operation of the coupling is as follows: Assuming that air under pressure has been applied through the valve 34 to the tubes or tires 26, 28, these tubes 26, 28 will expand to frictionally engage facing surfaces on the plates 8 and 18 and 18 and 14, respectively, and thereby provide a frictional drive coupling connecting the driving shaft 2 and the driven shaft 4.

An important advantage of this coupling driving lies in the extremely high torque capacity which is provided for the size of coupling due to the radial torque transmitting frictional surfaces between the tubes and the plates. Further, the flexible tubes which are of some flexible material such as rubber provide very effective torsional vibration damping. The fact that the air tubes 26 and 28 are interconnected permits balanced pressures under axial misalignment. The type of tube mounting wherein the tubes expand against the plates eliminates the need for vulcanizing or bonding or other means for holding the tubes in position. This has the additional advantage of simplifying replacement or service of the coupling.

A further important feature of the coupling is that the dual tube balanced construction eliminates axially thrust loads inasmuch as the equal pressures in each of the tubes are exerted on both sides of the plate 18; thus there will be no thrust bearing loads applied by the coupling. The coupling also permits both limited angular and offset misalignment due to the air cushion effect and the flexibility of the rubber tube torque transmission arrangement. The rib construction as indicated at 24 and 48 allows cooling of the coupling which is inherent in the construction of the coupling itself, i.e., as the coupling turns it "pumps" air through the coupling thereby providing the necessary cooling. Although the ribs 24 and 48 are shown only on the plates 8, 18 and 14, it should be readily appreciated that they could also be applied to the tubes 26 and 28.

I claim:

A torque transmitting coupling comprising substantially coaxial driving and driven shafts, one of said shafts having a first plate member fixed thereto normal to the axis of rotation thereof, a second plate member, a peripheral member fixing said second plate member to said first plate member at the peripheries thereof and normal to the axis of rotation of the one of said shafts, a third plate member fixed to the other of said shafts normal to the axis of rotation thereof and interposed between said first and second plate members and having said peripheral member outboard in the plane thereof, a pair of mutually inflatable axially expansible members interposed between said first plate member and said third plate member and said third plate member and second plate member, respectively, in frictional engagement therewith, one of said plate members having radially extending ribs defining with one of said inflatable members air conducting radially extending passages in open communication with the atmosphere at opposite ends thereof for centrifugally pumping air through said passages to cool said coupling, and means to inflate said expansible members comprising a pair of telescoped bushings extending axially through said third plate member into communication with said expansible members, said third plate member having a passage in communication with and extending radially outwardly from said bushings, and check valve means closing said passage at the periphery of said third plate member and accessible through an opening extending radially through said peripheral member.

References Cited in the file of this patent

UNITED STATES PATENTS

| | | |
|---|---|---|
| 2,386,478 | Kroff | Oct. 9, 1945 |
| 2,435,368 | Sadler | Feb. 3, 1948 |
| 2,621,768 | Cardwell | Dec. 16, 1952 |
| 2,626,031 | Fawick | Jan. 20, 1953 |

FOREIGN PATENTS

| | | |
|---|---|---|
| 687,280 | Germany | Jan. 26, 1940 |